US011386703B2

(12) United States Patent
Udagawa et al.

(10) Patent No.: US 11,386,703 B2
(45) Date of Patent: Jul. 12, 2022

(54) COUNTER RECEPTION SYSTEM AND SERVICE ROBOT

(71) Applicant: LAUREL PRECISION MACHINES CO., LTD., Osaka (JP)

(72) Inventors: Takahiro Udagawa, Matsudo (JP); Shinichiro Shimbashi, Tokyo (JP)

(73) Assignee: LAUREL PRECISION MACHINES CO., LTD., Osaka (JP)

( * ) Notice: Subject to any disclaimer, the term of this patent is extended or adjusted under 35 U.S.C. 154(b) by 875 days.

(21) Appl. No.: 16/225,420

(22) Filed: Dec. 19, 2018

(65) Prior Publication Data

US 2019/0130173 A1    May 2, 2019

Related U.S. Application Data

(63) Continuation of application No. PCT/JP2017/022670, filed on Jun. 20, 2017.

(30) Foreign Application Priority Data

Jun. 22, 2016  (JP) .............................. JP2016-123925

(51) Int. Cl.
*G05B 15/00*       (2006.01)
*G05B 19/00*       (2006.01)
(Continued)

(52) U.S. Cl.
CPC .......... *G06V 40/172* (2022.01); *B25J 9/1679* (2013.01); *B25J 11/008* (2013.01);
(Continued)

(58) Field of Classification Search
CPC .... B25J 11/0015; B25J 11/008; B25J 19/021; B25J 9/1679; C08K 2201/016;
(Continued)

(56) References Cited

U.S. PATENT DOCUMENTS 9,517,559 B2 * 12/2016 Kawabe ............... G05D 1/0251
2005/0151842 A1    7/2005 Oohashi
(Continued)

FOREIGN PATENT DOCUMENTS

CN          1680971 A    10/2005
CN        101414389 A     4/2009
(Continued)

OTHER PUBLICATIONS

Chinese Office Action dated May 25, 2021 in Chinese Application No. 201780038395.6, with English translation of search report, 9 pages.
(Continued)

*Primary Examiner* — Harry Y Oh
(74) *Attorney, Agent, or Firm* — Nixon & Vanderhye P.C.

(57) ABSTRACT

A service robot is capable of communicating with a reception device that assigns at least a reception number. The service robot includes: an image information acquirer that acquires image information including an image of a customer; a reception number acquirer that acquires a reception number from the reception device, in response to a reception operation performed by the customer; and a storage unit that stores the acquired reception number and the acquired image information in association with each other.

14 Claims, 3 Drawing Sheets

(51) Int. Cl.

| | | |
|---|---|---|
| *G06V 40/16* | (2022.01) | |
| *G06Q 40/02* | (2012.01) | |
| *G07D 9/00* | (2006.01) | |
| *B25J 9/16* | (2006.01) | |
| *B25J 11/00* | (2006.01) | |
| *B25J 19/02* | (2006.01) | |
| *G07B 1/08* | (2006.01) | |
| *G07B 5/04* | (2006.01) | |

(52) U.S. Cl.
CPC ......... *B25J 11/0015* (2013.01); *B25J 19/021* (2013.01); *G06Q 40/02* (2013.01); *G06V 40/165* (2022.01); *G07B 1/08* (2013.01); *G07B 5/04* (2013.01); *G07D 9/00* (2013.01)

(58) Field of Classification Search
CPC .... C08K 3/042; C08K 5/0025; C08K 5/3445; C08K 5/353; C08K 5/46; C08K 5/47; C08K 7/00; C08L 2201/08; C08L 2207/04; C08L 27/12; C08L 27/22; C08L 27/18; B29C 43/003; B29C 45/0001; B29C 48/022; G06Q 30/016; G06Q 40/02; G06Q 10/02; G07B 1/00; G07B 1/08; G07B 5/04; G07B 3/00; G07C 2011/04; G07D 9/00; A47J 27/0817; A47J 27/086; A47J 36/02; A47J 36/06; G06K 9/00248; G06K 9/00288
See application file for complete search history.

(56) References Cited

U.S. PATENT DOCUMENTS

| | | | |
|---|---|---|---|
| 2005/0222712 A1* | 10/2005 | Orita | G10L 15/26 704/E15.045 |
| 2013/0328765 A1 | 12/2013 | Kawamoto | |
| 2016/0196509 A1* | 7/2016 | Whitaker | G06Q 20/045 705/5 |
| 2016/0321568 A1* | 11/2016 | Gosuin | H04L 51/36 |

FOREIGN PATENT DOCUMENTS

| | | | |
|---|---|---|---|
| CN | 101425207 | A | 5/2009 |
| CN | 102059700 | A | 5/2011 |
| CN | 103914904 | A | 7/2014 |
| CN | 104077720 | A | 10/2014 |
| CN | 104318356 | A | 1/2015 |
| CN | 204965509 | U | 1/2016 |
| CN | 105488685 | A | 4/2016 |
| JP | 5-342472 | A | 12/1993 |
| JP | 2002-7726 | A | 1/2002 |
| JP | 2005-193351 | A | 7/2005 |
| JP | 2006-330957 | A | 12/2006 |
| JP | 2007011880 | A * | 1/2007 |
| JP | 2008-55578 | A | 3/2008 |
| JP | 2008-287381 | A | 11/2008 |
| JP | 2009-163417 | A | 7/2009 |
| JP | 2012-185625 | A | 9/2012 |
| JP | 2013-225198 | A | 10/2013 |
| JP | 2013-257697 | A | 12/2013 |
| JP | 2015-184656 | A | 10/2015 |
| JP | 2015-232791 | A | 12/2015 |
| KR | 10-2006-0008796 | A | 1/2006 |
| KR | 10-2009-0064809 | A | 6/2009 |
| KR | 10-2009-0064814 | A | 6/2009 |
| KR | 10-2009-0073683 | A | 7/2009 |
| KR | 10-2009-0116681 | A | 11/2009 |
| KR | 10-2011-0103537 | A | 9/2011 |
| KR | 10-1171826 | B1 | 8/2012 |
| KR | 10-1270774 | B1 | 6/2013 |

OTHER PUBLICATIONS

International Search Report dated Sep. 12, 2017 in International Application No. PCT/JP2017/022670, with English Translation (4 pages).
International Preliminary Report on Patentability dated Oct. 16, 2018 in International Application No. PCT/JP2017/022670, with English Translation (9 pages).
Gyoretsu o Zero ni sum Junbanmachi Kanri Apuri 'Air Wait' ga Pepper to Hakata de Korabo shiteita, [online], KADOKAWA Corp., Jun. 29, 2015 (Jun. 29, 2015), pp. 1 to 12, [retrieval date Aug. 30, 2017 (Aug. 30, 2017) ], Internet <URL:http://weekly.ascii.jp/elem/000/000/350/350904/>.
Notice of Grounds for Rejection dated Apr. 27, 2020 in Korean Application No. 10-2019-7000903, with English translation, 16 pages.
Extended European Search Report dated Nov. 7, 2019 in European Application No. 17815392.0, 12 pages.
Chinese Office Action dated Dec. 28, 2021 in Chinese Application No. 201780038395.6, with partial English translation (Search Report only), 11 pages.

* cited by examiner

US 11,386,703 B2

COUNTER RECEPTION SYSTEM AND SERVICE ROBOT

CROSS-REFERENCE TO RELATED APPLICATIONS

The present application is a continuation application of International Application No. PCT/JP2017/022670, filed Jun. 20, 2017, which claims priority to Japanese Patent Application No. 2016-123925, filed Jun. 22, 2016. The contents of these applications are incorporated herein by reference.

BACKGROUND OF THE INVENTION

Field of the Invention

The present invention relates to a counter reception system and a service robot.

Description of Related Art

In recent years, the introduction of counter reception systems has been proceeding for the purpose of streamlining counter tasks of financial institutions, government agencies, medical institutions, and the like. For example, Japanese Unexamined Patent Application, First Publication No. 2002-7726 discloses a general counter reception system including a ticket issuing device, an operation device, and a calling device. If a customer performs a reception process, the ticket issuing device issues a reception ticket indicating a reception number to the customer. The operation device receives an operation that counter staff performs when calling a new reception number. The calling device displays the reception number for which the calling operation has been performed and calls the customer to the counter by sound.

SUMMARY OF INVENTION

There is demand for improving services for customers in counter tasks.

An object of the present invention is to provide a counter reception system and a service robot which can improve services for customers.

In order to achieve the above object, a counter reception system according to an aspect of the present invention includes: a reception device that assigns at least a reception number; and a service robot that is capable of communicating with the reception device. The service robot includes: an image information acquirer that acquires first image information including an image of a customer; a reception number acquirer that acquires a first reception number from the reception device, in response to a reception operation performed by the customer; and a storage unit that stores the first reception number and the first image information in association with each other.

A service robot according to an aspect of the present invention is capable of communicating with a reception device that assigns at least a reception number, and includes: an image information acquirer that acquires image information including an image of a customer; a reception number acquirer that acquires a reception number from the reception device, in response to a reception operation performed by the customer; and a storage unit that stores the acquired reception number and the acquired image information in association with each other.

According to the counter reception system and the service robot of the present invention, it is possible to improve services for customers.

EMBODIMENTS FOR CARRYING OUT THE INVENTION

Figure 1:
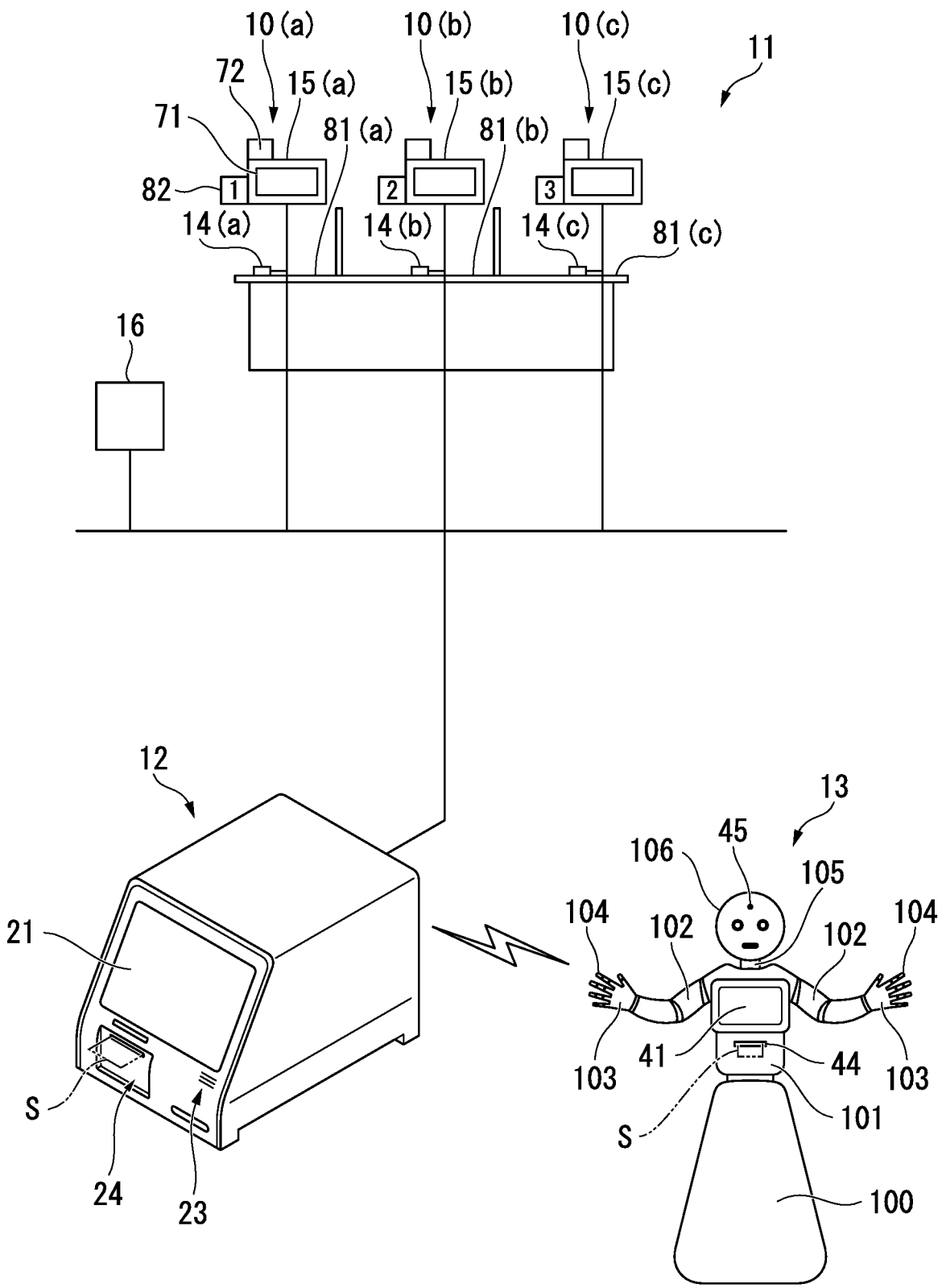
FIG. 1 is a configuration diagram showing a counter reception system according to an embodiment of the present invention.

A counter reception system 11 according to an embodiment of the present invention will be described below with reference to the drawings. The counter reception system 11 shown in FIG. 1 is used to assist with counter tasks of financial institutions, government agencies, medical institutions, and the like. Here, the case in which the counter reception system 11 is used at a branch of a financial institution such as a bank will be described as a specific example.

The counter reception system 11 has a reception device (ticket issuing device) 12, a service robot 13, a plurality of calling operation devices 14, a plurality of reception number calling devices 15, and a customer information database 16. The reception device 12 is installed, for example, between an entrance and reception counters 10 in the branch of the financial institution. The service robot 13 moves within the branch. The plurality of calling operation devices 14 are installed respectively at the plurality of reception counters 10 in the branch. Similar to the plurality of calling operation devices 14, the plurality of reception number calling devices 15 are installed respectively at the plurality of reception counters 10.

The reception device 12, the plurality of calling operation devices 14, the plurality of reception number calling devices 15, and the customer information database 16 are connected to a network such as a local area network (LAN) such that they can communicate with each other. The service robot 13 is also connected to this network by wireless communication. Therefore, the service robot 13 can communicate with the reception device 12, the plurality of calling operation devices 14, the plurality of reception number calling devices 15, and the customer information database 16 via this network. Thereby, the service robot 13 can cooperate with the reception device 12. The counter reception system 11 can also be connected to the Internet. For example, the counter reception system 11 receives visit-to-branch reservations on the basis of customer information, a branch, and a desired date and time entered by customers via a website. The reception device 12 stores this information and issues a reservation ID.

The reception device 12 is installed with its position fixed at a predetermined position in the branch. The reception device 12 integrally has a reception device operation display unit (ticket issuing device operation display unit) 21, a reception device sound output unit (ticket issuing device sound output unit) 23, a reception device ticket issuing mechanism (ticket issuing device ticket issuing mechanism) 24, a reception device storage unit (ticket issuing device storage unit) 25 (see FIG. 2), and a reception device controller (ticket issuing device controller) 30. The reception device operation display unit 21 includes a touch panel monitor which displays information to the customer such that it is visually recognizable and receives an input of a touch operation such as a reception operation performed by a customer. The reception device sound output unit 23 outputs sound to the customer. The reception device ticket issuing mechanism 24 includes a printer which issues a reception ticket S that is a sheet of paper to which a reception number is affixed by printing. The reception device storage unit 25 stores data. The reception device controller 30 controls the reception device operation display unit 21, the reception device sound output unit 23, the reception device ticket issuing mechanism 24, and the reception device storage unit 25.

As shown in FIG. 1, the service robot 13 has a shape simulating a human body. The service robot 13 has a lower body portion 100, a torso portion 101, two arm portions 102, two hand portions 103, two finger portions 104, a neck portion 105, and a head portion 106. Each finger portion 104 includes five fingers. The torso portion 101 is movably connected to the lower body portion 100. The two arm portions 102 are movably connected to the torso portion 101. The two hand portions 103 are movably connected to the two arm portions 102, respectively. The two finger portions 104 are movably connected to the two hand portions 103, respectively. The neck portion 105 is movably connected to the torso portion 101. The head portion 106 is movably connected to the neck portion 105. Each arm portion 102 is bendable. Each finger portion 104 is also bendable. This allows the service robot 13 to operate in a similar way to a human body. The service robot 13 is an autonomous mobile robot capable of interacting with customers. The service robot 13 autonomously moves, for example, with respect to a position near the entrance/exit of the branch as a basic position such that it moves away from the basic position and returns to the basic position.

Figure 2:
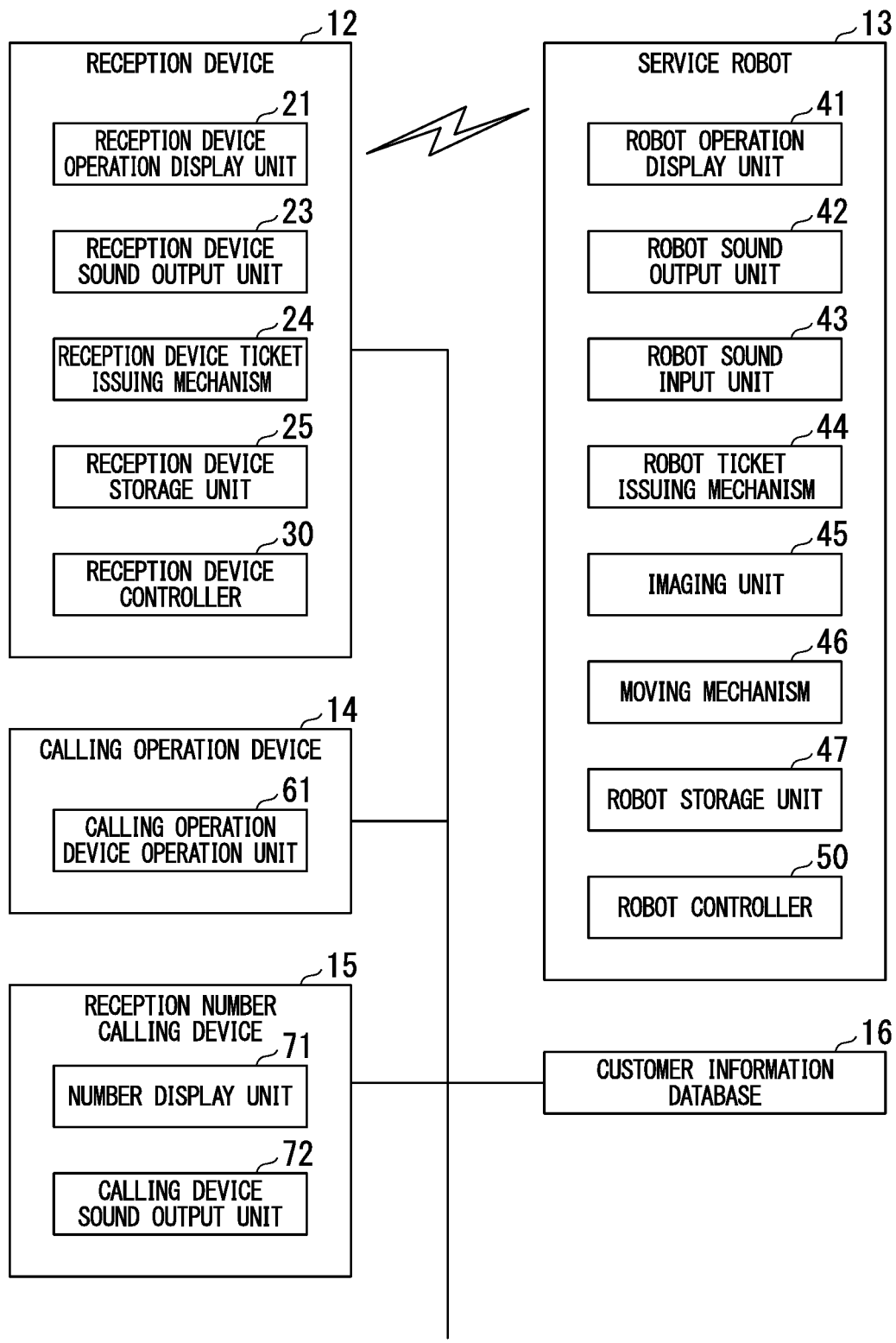
FIG. 2 is a block diagram showing the counter reception system shown in FIG. 1.

The service robot 13 has a robot operation display unit 41, a robot sound output unit 42 (see FIG. 2), and a robot sound input unit 43 (a sound recognizer) (see FIG. 2). The robot operation display unit 41 is provided at a position in front of an upper part of the torso portion 101 and includes a touch panel monitor that displays information to the customer such that it is visually recognizable and receives an input of a touch operation such as a reception operation performed by the customer. The robot sound output unit 42 outputs sound to the customer. The robot sound input unit 43 has sound recognition software installed to perform a sound recognition process and recognizes operations such as a reception operation from sound input by customers.

As shown in FIGS. 1 and 2, the service robot 13 includes a robot ticket issuing mechanism 44 (a ticket issuer), an imaging unit 45 (an image information acquirer), a moving mechanism 46 (see FIG. 2), a robot storage unit 47 (a storage unit), and a robot controller 50 (a reception number acquirer). As shown in FIG. 1, the robot ticket issuing mechanism 44 is provided below the robot operation display unit 41 at a position in front of the torso portion 101 and includes a printer which issues a reception ticket S that is a sheet of paper to which a reception number is affixed by printing. The imaging unit 45 includes a camera that is provided at a position in front of the head portion 106 of the service robot 13 and images the surroundings of the service robot 13 to acquire customer image information. The moving mechanism 46 is provided at a lower end position of the lower body portion 100 of the service robot 13 to cause the service robot 13 to run by itself. The robot storage unit 47 stores data. The robot controller 50 controls the robot ticket issuing mechanism 44, the imaging unit 45, the moving mechanism 46, and the robot storage unit 47.

The imaging unit 45 has identification software installed to perform a process of identifying a face in a captured image. The imaging unit 45 extracts face image information of customers (information including images of faces of customers) from captured image information. Further, the imaging unit 45 determines, for each piece of extracted face image information, the distance from the imaging unit 45 to a corresponding person (that is, a person corresponding to the face image information) and the direction in which the corresponding person is positioned (for example, the direction in which the corresponding person is positioned with reference to the imaging unit 45). The imaging unit 45 also extracts image information of objects from image information captured by the imaging unit 45. Further, the imaging unit 45 determines, for each piece of extracted image information, the distance from the imaging unit 45 to a corresponding object (that is, an object corresponding to the image information) and the direction in which the corresponding object is positioned (for example, the direction in which the corresponding object is positioned with reference to the imaging unit 45).

The case in which the moving mechanism 46 runs (moves) the service robot 13, for example, such that it approaches a target person will now be described. In this case, the moving mechanism 46 runs (moves) the service robot 13 such that it approaches a target person captured by the imaging unit 45 on the basis of the distance and direction of the target person with respect to the imaging unit 45 while searching for a route that avoids contact with people and objects captured by the imaging unit 45 on the basis of the distances and directions of the people and objects with respect to the imaging unit 45.

As shown in FIG. 1, the plurality of calling operation devices 14 are installed respectively on counters 81 of the plurality of reception counters 10. Each of the plurality of calling operation devices 14 has a calling operation device operation unit 61 shown in FIG. 2 which receives an input of a touch operation such as a calling operation performed by counter staff of a corresponding reception counter 10. As shown in FIG. 1, each of the plurality of calling operation devices 14 receives a calling operation from counter staff of a correspondingly arranged reception counter 10 when calling a new reception number.

The plurality of reception number calling devices 15 are also installed respectively on the counters 81 of the plurality of reception counters 10. Each of the reception number calling devices 15 has a number display unit (notification unit) 71 that provides notification of the reception number through a visually recognizable number display and a calling device sound output unit (notification unit) 72 that provides notification of the reception number through sound calling. The reception number calling device 15 provides notification of the reception number through at least one of number display and sound calling that has been set. Here, one reception number calling device 15 may be shared by the plurality of reception counters 10, rather than the plurality of reception number calling devices 15 being installed respectively at the plurality of reception counters 10. In this case, the reception number calling device 15 provides notification of reception number data and counter number data of a reception counter 10 at which the call took place.

In the example shown in FIG. 1, three calling operation devices 14 and three reception number calling devices 15 are provided. More specifically, a calling operation device 14(*a*)

and a reception number calling device 15(*a*) corresponding to the calling operation device 14(*a*) are provided on a counter 81(*a*) of a reception counter 10(*a*). A calling operation device 14(*b*) and a reception number calling device 15(*b*) corresponding to the calling operation device 14(*b*) are provided on a counter 81(*b*) of a reception counter 10(*b*). A calling operation device 14(*c*) and a reception number calling device 15(*c*) corresponding to the calling operation device 14(*c*) are provided on a counter 81(*c*) of a reception counter 10(*c*). Counter number display units 82 that display the respective counter numbers in black ink are provided respectively at the reception number calling devices 15.

[Ticket Issuing Operation of Reception Device]

The reception device operation display unit 21 of the reception device 12 can receive an input of a counter service alternatively selected from a plurality of counter services. In the reception device controller 30, different groups of numbers out of a group of available numbers (for example, "1" to "999") are set as respective groups of reception numbers for the counter services. The plurality of counter services may include first to fourth services. The first service includes deposit, withdrawal, transfer, and tax payment. The second service includes new account opening, time deposit tasks, and various notifications to financial institutions. The third service includes loans and various consultations. The fourth service includes service items other than the above services, namely, those other than the first to third services. For example, a number group of "1" to "299" is set for the first service. A number group of "300" to "599" is set for the second service. A number group of "600" to "799" is set for the third service. A number group of "800" to "999" is set for the fourth service.

For each counter service, the reception device controller 30 classifies the reception numbers into unissued reception numbers that have not been issued, uncalled reception number that have been issued but not called, and called reception numbers that have been issued and called, and stores them in the reception device storage unit 25. Once the reception device controller 30 is reset when the branch opens, all reception numbers are classified as unissued reception numbers.

The reception device operation display unit 21 receives an input of a selection operation to select a counter service as a reception operation. When the reception device operation display unit 21 has received the selection operation, the reception device controller 30 selects the smallest reception number from reception numbers classified as unissued at the time of the operation among a group of numbers assigned to the input counter service as a reception number to be issued. The reception device controller 30 prints the selected reception number and waiting people count related information on a sheet of paper and issues the printed sheet of paper as a reception ticket S through the reception device ticket issuing mechanism 24. The people count related information is information based on the difference between the selected reception number and the greatest called reception number among the group of numbers assigned to the input counter service.

Here, the waiting people count related information may be the number of people waiting. The number of people waiting indicates the number of people who have not yet been called and will be called prior to the person who has received the issued reception ticket S. The number of people waiting is obtained by subtracting a reception number that has been called from the reception number to be issued and further subtracting "1" from the resulting value. The waiting people count related information may be a calling order number. The calling order number indicates in what order the person who has received the reception ticket S will be called from now. The calling order number is calculated by subtracting the called reception number from the reception number to be issued. The case in which the reception number to be issued is 10 and the called reception number is 5 will now be described as a specific example. In this example, the number of people waiting is "4" (=10−5−1) people and the person who has received the reception ticket S will be called "fifth" (=(10−5)th) from now.

Then, the reception device controller 30 changes the classification of this reception number from an unissued reception number to an uncalled reception number and causes the reception device storage unit 25 to store it. In accordance with the issuance of the reception ticket S, the reception device controller 30 may provide notification of the reception number and the waiting people count related information through at least one of display on the reception device operation display unit 21 and sound output of the reception device sound output unit 23.

The reception device controller 30 may perform the following processing. That is, the reception device controller 30 obtains the waiting people count related information (for example, the number of people waiting or the calling order number) on the basis of the difference between the reception number to be issued and the greatest called reception number among the same group of numbers as the reception number to be issued. When the waiting people count related information is greater than a predetermined value, the reception device controller 30 causes the reception device operation display unit 21 to display the reception number to be issued, the waiting people count related information, and a display item prompting use of an automatic device such as an ATM and also to display a display item prompting decision as to whether or not to issue the reception ticket S. Further, in a state in which the reception device operation display unit 21 displays such display items, the reception device controller 30 causes the reception device operation display unit 21 to receive an input indicating selection of whether or not to issue the reception ticket S.

In this case, the case in which the reception device operation display unit 21 has received an operation input indicating decision (selection) to issue the reception ticket S in a state in which a display item or the like prompting decision as to whether or not to issue the reception ticket S is displayed will now be described. In this case, the reception device controller 30 prints the reception number to be issued and the waiting people count related information on a sheet of paper and issues the sheet of paper as the reception ticket S through the reception device ticket issuing mechanism 24. Further, the reception device controller 30 changes the classification of the issued reception number from an unissued reception number to an uncalled reception number and causes the reception device storage unit 25 to store information indicating that the issued reception number has been classified as an uncalled reception number. Next, the case in which the reception device operation display unit 21 has received an operation input indicating decision not to issue the reception ticket S in a state in which a display item or the like prompting decision as to whether or not to issue the reception ticket S is displayed will now be described. In this case, without issuing the reception ticket S, the reception device controller 30 keeps the classification of the reception number that has not been issued (the reception number of the reception ticket S that was scheduled to be issued but has not been issued, which will be the same hereinafter) the same as the classification of unissued reception numbers in the reception device storage unit 25. That is, the reception device controller 30 does not change information on unissued reception numbers stored in the reception device storage unit 25.

Regardless of the waiting people count related information described above, the reception device controller 30 may always cause the reception device operation display unit 21 to display the reception number to be issued, the waiting people count related information, and a display item prompting decision as to whether or not to issue the reception ticket S and cause the reception device operation display unit 21 to receive an input indicating selection of whether or not to issue the reception ticket S.

In this case, the case in which the reception device operation display unit 21 has received an operation input indicating decision (selection) to issue the reception ticket S in a state in which a display item or the like prompting decision as to whether or not to issue the reception ticket S is displayed will now be described. In this case, the reception device controller 30 prints the reception number to be issued and the waiting people count related information on a sheet of paper and issues the sheet of paper as the reception ticket S through the reception device ticket issuing mechanism 24. Further, the reception device controller 30 changes the classification of the issued reception number from an unissued reception number to an uncalled reception number and causes the reception device storage unit 25 to store information indicating that the issued reception number has been classified as an uncalled reception number. Next, the case in which the reception device operation display unit 21 has received an operation input indicating decision not to issue the reception ticket S in a state in which a display item or the like prompting decision as to whether or not to issue the reception ticket S is displayed will now be described. In this case, without issuing the reception ticket S, the reception device controller 30 keeps the classification of the reception number that has not been issued the same as the classification of unissued reception numbers in the reception device storage unit 25.

When the waiting people count related information is greater than the predetermined value, the reception device controller 30 may omit the issuance of the reception ticket S, cause the reception device operation display unit 21 to display a display item prompting use of the automatic device, and guide the customer to the automatic device. In this case as well, the reception device controller 30 keeps the classification of the reception number that has not been issued the same as the classification of unissued reception numbers in the reception device storage unit 25.

When the number of people waiting indicated by the waiting people count related information is "0" (that is, when there is no people waiting), the reception device controller 30 may omit the issuance of the reception ticket S, cause the reception device operation display unit 21 to display a display item indicating that the number of people waiting is "0" and a display item showing an open counter, and guide the customer to this counter. In this case as well, the reception device controller 30 keeps the classification of the reception number to be issued the same as the classification of unissued reception numbers in the reception device storage unit 25. It is to be noted that, even if the issuance of the reception ticket S is omitted and the customer is guided to the counter when the number of people waiting is "0," the reception number N itself which was originally supposed to be issued may still be assigned. In this case, the reception device controller 30 changes the classification of the reception number N to the classification of called reception numbers. This is because the reception number N is needed to perform statistical management of the number of customers who have visited the branch on the day, their waiting time, or the like for each counter service. Data indicating that the waiting time of the reception number N is "0" will also contribute as a piece of data for statistical management.

The case in which, when a customer terminal such as a smartphone with dedicated application software installed therein is held over the reception device 12, the reception number is stored in the customer terminal will now be described. In this case, it is possible to display the reception number on a screen of the customer terminal and thereby it is also possible to make the reception ticket S unnecessary.

As described above, the reception device 12 can assign a reception number in response to a reception operation performed by a customer and issue a reception ticket S with the assigned reception number affixed thereto.

[Operation of Service Robot]

The service robot 13 can also receive an input of a counter service alternatively selected from a plurality of counter services.

The robot controller 50 causes the imaging unit 45 to capture an image and acquire image information. The robot controller 50 causes the imaging unit 45 to extract face image information of a customer who has approached a distance where they can operate the robot operation display unit 41 from the image information. The imaging unit 45 extracts face image information of a customer who has approached a predetermined face-to-face distance. The predetermined face-to-face distance is a distance where it can be determined that the customer is facing the service robot 13, for example, a distance where the customer is facing the service robot 13. When the imaging unit 45 has extracted face image information of the customer who has approached the predetermined face-to-face distance, the robot controller 50 determines whether or not face image information that can be determined as that of the same person as the extracted face image information (face image information of the same person as the extracted face image information) is present among pieces of face image information that are stored in the robot storage unit 47 in association with reception numbers classified as uncalled reception numbers. That is, the robot controller 50 determines whether or not face image information indicating the same face as that indicated by the extracted face image information is present among pieces of face image information that are stored in the robot storage unit 47 in association with reception numbers classified as uncalled reception numbers. As will be described later, reception numbers that have already been issued by the service robot 13 and classified as uncalled reception numbers are stored in the robot storage unit 47 in association with face image information of customers. Therefore, first, the robot controller 50 determines whether or not the customer is that for whom a reception ticket S has been issued by the service robot 13 from the face image information of the customer. In this determination, if face image information that can be determined as that of the same person as the face image information of the customer who has approached the predetermined face-to-face distance is not stored in the robot storage unit 47 in association with a reception number classified as an uncalled reception number, the robot controller 50 can determine that the customer is not that for whom a reception ticket S has been issued. Upon determining that the customer is not that for whom a reception ticket S has been issued, the robot controller 50 causes the robot operation display unit 41 to display an input screen for an operation of selecting a counter service as a reception operation for issuance of the reception ticket S.

[Ticket Issuing Operation of Service Robot]

Figure 3:
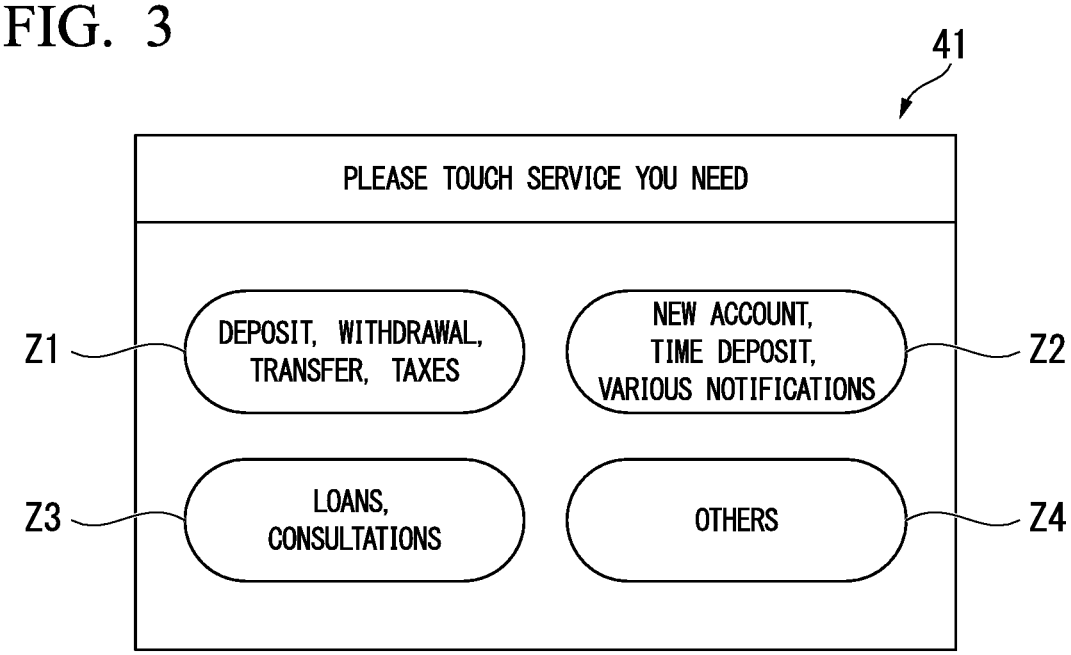
FIG. 3 is a front view showing an example of an input screen for a robot operation display unit in the counter reception system shown in FIG. 1.

For example, as shown in FIG. 3, the input screen for an operation of selecting a counter service on the robot operation display unit 41 has a touch region Z1, a touch region Z2, a touch region Z3, and a touch region Z4. The touch region Z1 includes a display item of the first service including deposit, withdrawal, transfer and tax payment, that is, a display item of letters of "DEPOSIT, WITHDRAWAL, TRANSFER, TAXES." The touch region Z2 includes a display item of the second service including new account opening, time deposit tasks, and various notifications to financial institutions, that is, a display item of letters of "NEW ACCOUNT, TIME DEPOSIT, VARIOUS NOTIFICATIONS." The touch region Z3 includes a display item of the third service including loans and various consultations, that is, a display item of letters of "LOANS, CONSULTATIONS." The touch region Z4 includes a display item of the fourth service which is other than the above services, that is, a display item of letters of "OTHERS." The robot controller 50 determines that a counter service corresponding to a touched region has been selected from the first to fourth touch regions Z1 to Z4.

When an operation of selecting a counter service is input to the robot operation display unit 41 as a reception operation through a touch operation, the robot controller 50 transmits a reception number request signal including the selected counter service to the reception device controller 30. Upon receiving this reception number request signal, the reception device controller 30 selects a reception number which is the smallest at the time of receiving the reception number request signal among reception numbers classified as unissued reception numbers out of the group of numbers assigned to this counter service as a reception number to be issued. Then, the reception device controller 30 transmits a reception number reply signal including the selected reception number and waiting people count related information to the robot controller 50. Further, the reception device controller 30 changes the classification of the reception number to be issued from an unissued reception number to an uncalled reception number and stores it. The waiting people count related information is information based on the difference between the selected reception number and the greatest called reception number among the group of numbers assigned to the selected counter service.

Upon receiving the reception number reply signal, the robot controller 50 prints the reception number and the waiting people count related information included in the reception number reply signal on a sheet of paper and issues the sheet of paper as a reception ticket S through the robot ticket issuing mechanism 44. Further, the robot controller 50 stores the reception number and face image information of the customer who has approached the predetermined face-to-face distance, which has been extracted by the imaging unit 45 at the time of the current reception operation on the robot operation display unit 41, in the robot storage unit 47 in association with each other. In accordance with the issuance of the reception ticket S, the robot controller 50 may provide notification of the reception number and the waiting people count related information through at least one of display of the robot operation display unit 41 and sound output of the robot sound output unit 42. The case in which the robot controller 50 detects that the customer has forgotten to take out the reception ticket S issued by the robot ticket issuing mechanism 44 will now be described. In this case, the robot controller 50 may search for and approach the customer on the basis of face image information of the customer that is stored in the robot storage unit 47 in association with the reception number of the reception ticket S and notify the customer of having forgotten to take out the reception ticket S.

As described above, the robot controller 50 acquires a reception number from the reception device 12 in response to a reception operation performed by a customer and the robot storage unit 47 stores the reception number acquired by the robot controller 50 and image information acquired by the imaging unit 45 in association with each other. Further, the robot ticket issuing mechanism 44 issues a reception ticket S to which the reception number that the robot controller 50 has acquired from the reception device 12 is affixed.

The robot controller 50 may perform the following processing. That is, the robot controller 50 obtains waiting people count related information (for example, the number of people waiting or the calling order number) on the basis of the difference between the reception number to be issued and the greatest called reception number among the same group of numbers as the reception number to be issued. When a value indicated by the waiting people count related information is greater than a predetermined value, the robot controller 50 may allow the customer to decide whether or not to issue the reception ticket S (or whether or not to proceed with the reception process). In this case, the reception device controller 30 which has received the reception number request signal waits without changing the classification of the reception number to be issued from an unissued reception number to an uncalled reception number and transmits the reception number to be issued and the waiting people count related information to the robot controller 50. Then, the robot controller 50 causes the robot operation display unit 41 to display the reception number to be issued, the waiting people count related information, and a display item prompting use of an automatic device such as the ATM and to display a display item prompting decision as to whether or not to issue the reception ticket S (or decision as to whether or not to proceed with the reception process).

The case in which the robot operation display unit 41 has received an operation input indicating decision to issue the reception ticket S (or decision to proceed with the reception process) in a state in which a display item or the like prompting decision as to whether or not to issue the reception ticket S is displayed will now be described. In this case, the robot controller 50 prints the reception number and the waiting people count related information on a sheet of paper and issues the sheet of paper as the reception ticket S through the robot ticket issuing mechanism 44. In this case as well, in accordance with the issuance of the reception ticket S, the robot controller 50 may provide notification of the reception number and the waiting people count related information through at least one of display of the robot operation display unit 41 and sound output of the robot sound output unit 42. When the robot ticket issuing mechanism 44 has issued the reception ticket S to which the reception number and the waiting people count related information are affixed, the robot controller 50 transmits a signal indicating this fact to the reception device controller 30. Upon receiving this signal, the reception device controller 30 changes the classification of the reception number from an unissued reception number to an uncalled reception number and causes the reception device storage unit 25 to store information indicating that the reception number has been classified as an uncalled reception number. Next, the case in which an operation input indicating decision not to issue the reception ticket S (or decision to stop the reception process) has been performed on the robot operation display unit 41 in a state in which a display item or the like prompting decision as to whether or not to issue the reception ticket S is displayed will now be described. In this case, without issuing the reception ticket S, the robot controller 50 transmits a signal indicating this fact to the reception device controller 30. Upon receiving this signal, the reception device controller 30 keeps the classification of this reception number the same as the classification of unissued reception numbers in the reception device storage unit 25. This allows the service robot 13 to guide the customer according to congestion situations within the branch. Specifically, the service robot 13 leads the customer to the automatic device at the time of congestion. Even when the customer has left the service robot 13 without performing an operation input indicating that the reception ticket S is not to be issued, the service robot 13 determines that an operation input indicating that the reception ticket S is not to be issued has been performed and proceeds with the processing. Further, the number of customers who have been guided to the automatic device without issuing the reception ticket S may be recorded in the reception device storage unit 25, together with information on the determination time, such that it is used for statistical management of the number of customers who have visited the branch on the day, their waiting time, or the like.

Regardless of the waiting people count related information described above, the robot controller 50 may always cause the robot operation display unit 41 to display the reception number to be issued, the waiting people count related information, and a display item prompting decision as to whether or not to issue the reception ticket S and cause the robot operation display unit 41 to receive an input indicating selection of whether or not to issue the reception ticket S.

In this case, the case in which the robot operation display unit 41 has received an operation input indicating decision to issue the reception ticket S in a state in which a display item or the like prompting decision as to whether or not to issue the reception ticket S is displayed will now be described. In this case, the robot controller 50 prints the reception number to be issued and the waiting people count related information on a sheet of paper and issues the sheet of paper as the reception ticket S through the robot ticket issuing mechanism 44. Further, the robot controller 50 transmits a signal indicating that the reception ticket S is to be issued to the reception device controller 30. In this case as well, in accordance with the issuance of the reception ticket S, the robot controller 50 may provide notification of the reception number and the waiting people count related information through at least one of display of the robot operation display unit 41 and sound output of the robot sound output unit 42. Upon receiving the signal indicating that the reception ticket S is to be issued, the reception device controller 30 changes the classification of this reception number from an unissued reception number to an uncalled reception number and causes the reception device storage unit 25 to store information indicating that this reception number has been classified as an uncalled reception number. Next, the case in which the robot operation display unit 41 has received an operation input indicating decision not to issue the reception ticket S in a state in which a display item or the like prompting decision as to whether or not to issue the reception ticket S is displayed will now be described. In this case, without issuing the reception ticket S, the robot controller 50 transmits a signal indicating that the reception ticket S is not to be issued to the reception device controller 30. Upon receiving this signal, the reception device controller 30 keeps the classification of this reception number the same as the classification of unissued reception numbers in the reception device storage unit 25.

When the value indicated by the waiting people count related information is greater than the predetermined value, the robot controller 50 may omit the issuance of the reception ticket S, cause the robot operation display unit 41 to display a display item prompting use of the automatic device, and guide the customer to the automatic device. In accordance with this, the robot sound output unit 42 may output a message indicating that the reception ticket S is not issued by sound. In this case as well, the reception device controller 30 keeps the classification of the reception number that has not been issued (the reception number that was scheduled to be issued but has not been issued) the same as the classification of unissued reception numbers in the reception device storage unit 25.

When the number of people waiting indicated by the waiting people count related information is "0", the robot controller 50 may omit the issuance of the reception ticket S, cause the robot operation display unit 41 to display a display item indicating that the number of people waiting is "0" and a display item showing an open counter, and guide the customer to this counter. In accordance with this, the robot sound output unit 42 may output a message indicating the open counter by sound. In this case, the reception device controller 30 keeps the classification of the reception number that was scheduled to be printed on the reception ticket S that has not been issued the same as the classification of unissued reception numbers in the reception device storage unit 25. It is to be noted that in the case in which the reception number N itself which was originally supposed to be issued is assigned for statistical management, the classification of the reception number N is changed to the classification of called reception numbers.

The case in which, when a customer terminal such as a smartphone is held over the service robot 13, the reception number is stored in the customer terminal will now be described as an example. In this case, it is possible to display the reception number on a screen of the customer terminal and thereby it is also possible to make the reception ticket S unnecessary.

The robot sound input unit 43 of the service robot 13 can receive an input of a counter service alternatively selected from a plurality of counter services by sound. When the robot sound input unit 43 has received an operation of selecting a counter service from the customer as the reception operation by sound, the robot controller 50 causes the imaging unit 45 to extract face image information of the customer who has approached a predetermined face-to-face distance, similar to the above. Further, the robot controller 50 transmits a reception number request signal including the selected counter service to the reception device controller 30. Upon receiving this reception number request signal, the reception device controller 30 selects a reception number which is the smallest at the time of receiving the reception number request signal among reception numbers classified as unissued reception numbers out of the group of numbers assigned to this counter service as a reception number to be issued, similar to the above. Then, the reception device controller 30 transmits a reception number reply signal including the selected reception number and waiting people count related information to the robot controller 50. Further, the reception device controller 30 changes the classification of this reception number from an unissued reception number to an uncalled reception number and stores it.

Upon receiving the reception number reply signal, the robot controller 50 causes the robot sound output unit 42 to output the reception number and the waiting people count related information included in the reception number reply signal by sound. Further, the robot controller 50 stores the reception number and face image information of the customer who has approached the predetermined face-to-face distance, which has been extracted by the imaging unit 45 at the time of the current reception operation on the robot sound input unit 43, in the robot storage unit 47 in association with each other. That is, the robot sound output unit 42 outputs the reception number that the robot controller 50 has acquired from the reception device 12 by sound. In addition to the sound output of the robot sound output unit 42, the reception number and the waiting people count related information may be printed on a sheet of paper and issued as a reception ticket S through the robot ticket issuing mechanism 44. Here, the reception ticket S may include the reception number and the waiting people count related information displayed in Braille.

The robot operation display unit 41 of the service robot 13 can receive inputs for a waiting status query service and a reception ticket reissuance service. The robot controller 50 causes the imaging unit 45 to capture an image and acquire image information. The robot controller 50 causes the imaging unit 45 to extract face image information of a customer who has approached the predetermined face-to-face distance from the image information. When the imaging unit 45 has extracted face image information of the customer who has approached the predetermined face-to-face distance, the robot controller 50 determines whether or not face image information that can be determined as that of the same person as the extracted face image information is present among pieces of face image information that are stored in the robot storage unit 47 in association with reception numbers classified as uncalled reception numbers. If face image information that can be determined as that of the same person as the face image information of the customer who has approached the predetermined face-to-face distance is stored in the robot storage unit 47 in association with a reception number classified as an uncalled reception number, it is determined that the customer is that for whom a reception ticket S has been issued and who has not yet been called from the counter. Therefore, upon determining that the customer is that for whom a reception ticket S has been issued and who has not yet been called from the counter, the robot controller 50 causes the robot operation display unit 41 to display an input screen for an operation of selecting a waiting status query service and a reception ticket reissuance service rather than the above-mentioned input screen for an operation of selecting a counter service.

[Waiting Status Query Operation of Service Robot]

The case in which the robot operation display unit 41 has received an input of an operation of selecting a waiting status query service through a touch operation on such an input screen will now be described. In this case, the robot controller 50 transmits a waiting people count related information request signal to the reception device controller 30. The waiting people count related information request signal is a signal for waiting status query and includes a reception number that is stored in the robot storage unit 47 in association with face image information that can be determined as that of the same person as the face image information of the customer who has approached the predetermined face-to-face distance. Upon receiving this waiting people count related information request signal, the reception device controller 30 transmits a waiting people count related information reply signal including the reception number included in the waiting people count related information request signal and waiting people count related information to the robot controller 50. The waiting people count related information is information based on the difference between the reception number included in the waiting people count related information request signal and the greatest called reception number among the same group of numbers as the reception number. Upon receiving the waiting people count related information reply signal, the robot controller 50 causes the robot operation display unit 41 to display the reception number and the number of people waiting based on the waiting people count related information included in the waiting people count related information reply signal. The robot operation display unit 41 displays, for example, "reception number α" and "the number of people waiting β." In accordance with this, the robot controller 50 may cause the robot sound output unit 42 to output the same content by sound. For example, the robot sound output unit 42 may output a message "Reception number α, the number of waiting people is β" by sound. Notification of the waiting people count related information is not limited to that of the number of people waiting. The robot controller 50 may cause the robot operation display unit 41 or the robot sound output unit 42 to provide notification of in what order the reception number will be called from now on the basis of the waiting people count related information. In this case, the robot operation display unit 41 may display, for example, "Reception number α will be called γth from now." The robot sound output unit 42 may output, for example, a message "Reception number α will be called γth from now" by sound.

Before the imaging unit 45 extracts face image information of a customer who has approached the predetermined face-to-face distance, the robot controller 50 causes the robot operation display unit 41 to display "You can query the waiting status by holding the reception ticket over here". When the imaging unit 45 reads the reception number of the reception ticket S by image recognition in this state, the robot controller 50 transmits a waiting people count related information request signal for waiting status query, which includes the reception number, to the reception device controller 30. Then, the reception device controller 30 transmits a waiting people count related information reply signal to the robot controller 50, similar to the above. The robot controller 50 causes the robot operation display unit 41 to display the reception number and the waiting people count related information included in the waiting people count related information reply signal. In accordance with this, the robot controller 50 may output the same content to the robot sound output unit 42 by sound. The case in which the imaging unit 45 has extracted face image information of a customer who has approached the predetermined face-to-face distance and the robot sound input unit 43 has received a sound input of words similar to "waiting status" query will now be described. In this case, the robot controller 50 determines whether or not face image information that can be determined as that of the same person as the extracted face image information is present among pieces of face image information that are stored in the robot storage unit 47 in association with reception numbers classified as uncalled reception numbers and also checks whether or not the extracted face image information is stored in the robot storage unit 47 in association with a reception number classified as an uncalled reception number. The case in which the robot controller 50 determines that face image information that can be determined as that of the same person as the extracted face image information is present among pieces of face image information that are stored in the robot storage unit 47 in association with reception numbers classified as uncalled reception numbers and determines that the extracted face image information is stored in the robot storage unit 47 in association with a reception number classified as an uncalled reception number will now be described. In this case, the robot controller 50 may cause the robot operation display unit 41 to display the waiting people count related information or cause the robot sound output unit 42 to output the waiting people count related information by sound.

As described above, the service robot 13 reads a reception number corresponding to image information acquired by the imaging unit 45 from the robot storage unit 47 at the time of a waiting status query operation by a customer, that is, at the time of checking of the waiting people count related information by the customer, and provides notification of the waiting people count related information for the read reception number.

[Ticket Reissuance Operation of Service Robot]

The case in which an operation of selecting a reception ticket reissuance service has been input to the robot operation display unit 41 on the input screen for an operation of selecting a waiting status query service and a reception ticket reissuance service will now be described. In this case, the robot controller 50 transmits a waiting people count related information request signal for waiting status query, which includes a reception number that is stored in the robot storage unit 47 in association with face image information that can be determined as that of the same person as the face image information of the customer who has approached the predetermined face-to-face distance, to the reception device controller 30. Upon receiving this waiting people count related information request signal, the reception device controller 30 transmits a waiting people count related information reply signal, which includes waiting people count related information and the reception number included in the waiting people count related information request signal, to the robot controller 50. The waiting people count related information is information based on the difference between the reception number included in the waiting people count related information request signal and the greatest called reception number among the same group of numbers as the reception number. Upon receiving the waiting people count related information reply signal, the robot controller 50 prints the reception number and the waiting people count related information included in the waiting people count related information reply signal on a sheet of paper and reissues the sheet of paper as a reception ticket S through the robot ticket issuing mechanism 44. Thus, the latest information at the time of reissuance is printed as the waiting people count related information. In accordance with the issuance of the reception ticket S, the robot controller 50 may provide notification of the reception number and the waiting people count related information through at least one of display of the robot operation display unit 41 and sound output of the robot sound output unit 42. The case in which the imaging unit 45 has extracted face image information of a customer who has approached the predetermined face-to-face distance and the robot sound input unit 43 has received a sound input of words similar to "reissue" or "have lost the reception ticket S" will now be described. In this case, the robot controller 50 determines whether or not face image information that can be determined as that of the same person as the extracted face image information is present among pieces of face image information that are stored in the robot storage unit 47 in association with reception numbers classified as uncalled reception numbers and also checks whether or not the extracted face image information is stored in the robot storage unit 47 in association with a reception number classified as an uncalled reception number. The case in which the robot controller 50 determines that face image information that can be determined as that of the same person as the extracted face image information is present among pieces of face image information that are stored in the robot storage unit 47 in association with reception numbers classified as uncalled reception numbers and determines that the extracted face image information is stored in the robot storage unit 47 in association with a reception number classified as an uncalled reception number will now be described. In this case, the robot controller 50 prints the reception number of the customer and waiting people count related information at that time on a sheet of paper and reissues it. The robot controller 50 may cause the robot operation display unit 41 to display the waiting people count related information at that time or cause the robot sound output unit 42 to output the waiting people count related information by sound.

As described above, the service robot 13 reads a reception number corresponding to image information acquired by the imaging unit 45 from the robot storage unit 47 at the time of a ticket reissuance operation by a customer, that is, at the time of reissuance of a reception ticket, and causes the robot ticket issuing mechanism 44 to issue a reception ticket S to which the reception number is affixed.

The present invention is not limited to reissuance of the reception ticket S to which the reception number is affixed. At least one of the robot operation display unit 41 and the robot sound output unit 42 may be caused to provide notification of the reception number. As an alternative method, ticket reissuance may be performed or only notification may be performed without ticket reissuance on the basis of a selection operation on the robot operation display unit 41.

[Calling Operation]

The case in which a calling operation has been input to a calling operation device operation unit 61 of a calling operation device 14 as an operation for calling a new reception number by the counter staff will now be described. In this case, the calling operation device 14 transmits a call number request signal including an identifier of a reception counter 10 provided with the calling operation device 14 to the reception device controller 30 of the reception device 12. Then, the reception device controller 30 selects, as a reception number to be called, the smallest reception number classified as an uncalled reception number at the time of receiving the call number request signal out of a group of numbers assigned to a counter service corresponding to the reception counter 10 corresponding to the identifier included in the received call number request signal. Then, the reception device controller 30 outputs a call number reply signal to a reception number calling device 15 of the reception counter 10 corresponding to the identifier included in the received call number request signal, that is, to a reception number calling device 15 of the same reception counter 10 as that of the calling operation device 14 to which the calling operation has been input, and outputs the same to the robot controller 50 of the service robot 13. Further, the reception device controller 30 changes the classification of this reception number from an uncalled reception number to a called reception number and stores it. The call number reply signal includes the selected reception number and the identifier of the reception counter 10 included in the call number request signal.

Upon receiving the call number reply signal, the reception number calling device 15 provides notification of the reception number included in the received call number reply signal through at least one of the number display unit 71 and the calling device sound output unit 72 that has been set. That is, if notification by the number display unit 71 has been set, the number display unit 71 displays the reception number included in the received call number reply signal such that it is visually recognizable. On the other hand, if notification by the calling device sound output unit 72 has been set, the calling device sound output unit 72 outputs the reception number included in the received call number reply signal by sound. Normally, at least the number display unit 71 displays the reception number such that it is visually recognizable.

Upon receiving the call number reply signal, the robot controller 50 provides notification of the reception number included in the received call number reply signal and a counter number corresponding to the identifier of the reception counter 10 included in the call number reply signal through at least one of the robot operation display unit 41 and the robot sound output unit 42 that has been set. This allows the customer to know the reception number and the counter number of the reception counter 10 that has called the reception number. That is, if notification by the robot operation display unit 41 has been set, the robot operation display unit 41 displays the reception number included in the received call number reply signal and the counter number corresponding to the identifier of the reception counter 10 included in the call number reply signal such that it is visually recognizable. On the other hand, if notification by the robot sound output unit 42 has been set, the robot sound output unit 42 outputs the reception number included in the received call number reply signal and the counter number corresponding to the identifier of the reception counter 10 included in the call number reply signal by sound. The robot sound output unit 42 outputs, for example, a message "Reception number $\alpha$, counter $\delta$ is calling" by sound. Normally, at least the robot sound output unit 42 outputs the reception number and the counter number by sound.

As described above, when a calling operation is performed on the calling operation device 14, the reception device 12 transmits the called reception number to the reception number calling device 15 and the service robot 13. Further, the reception number calling device 15 and the service robot 13 provide notification of the called reception number, received from the reception device 12, through at least one of display and sound calling.

Upon receiving the call number reply signal from the reception device controller 30, the robot controller 50 may not provide notification at the spot, but may instead search for, approach, and notify the customer on the basis of face image information of the customer that is stored in the robot storage unit 47 in association with the called reception number included in the received call number reply signal.

In this case, the robot controller 50 reads face image information of the customer that is stored in the robot storage unit 47 in association with the called reception number included in the call number reply signal received from the reception device controller 30. At the same time, the robot controller 50 extracts surrounding face image information through the imaging unit 45. If the extracted face image information includes face image information that can be determined as that of the same person as the face image information corresponding to the called reception number, the robot controller 50 causes, on the basis of this face image information, the moving mechanism 46 to move the service robot 13 in a direction where a person of this face image information is present. Upon approaching a predetermined distance to the person of the face image information, the robot controller 50 provides notification of the called reception number and the counter number which has called the reception number through at least one of visually recognizable display of the robot operation display unit 41 and sound calling of the robot sound output unit 42. Further, the robot controller 50 may extract surrounding face image information through the imaging unit 45, determine whether or not the extracted face image information includes face image information that can be determined as that of the same person as the face image information corresponding to the called reception number, and notify a calling operation device 14 of the corresponding counter of the determination result through the reception device 12. This allows the counter staff to know whether or not the called person is present in the branch. Thus, it is possible to prevent a call from being canceled or suspended by mistake. When the robot controller 50 has detected a person of face image information corresponding to a reception number that was absent at the time of calling, the robot controller 50 may notify the calling operation device 14 at the corresponding counter of this fact through the reception device 12. The service robot 13 may detect a person of face image information corresponding to a reception number to be called next to the reception number included in the call number reply signal and provide notification like "Reception number $\alpha$ will be called next."

This will lead to improved services for people with disabilities such as hard-of-hearing people. The case in which the robot controller 50 determines that face image information that can be determined as that of the same person as the face image information corresponding to the called reception number is present and determines that a person of this face image information is moving toward the reception counter 10 will now be described. In this case, the robot controller 50 keeps watching as it is without performing movement and notification of the service robot 13.

As described above, the service robot 13 reads, from the robot storage unit 47, image information of the customer stored in association with a called reception number received from the reception device controller 30. Further, the service robot 13 finds image information corresponding to the read image information through the imaging unit 45, moves in a direction based on this image information, and provides notification of the called reception number through at least one of number display and sound calling.

Upon extracting face image information of a customer who has approached the predetermined face-to-face distance through the imaging unit 45, the service robot 13 checks the extracted face image information with the customer information database 16 in the branch to identify the customer and performs guidance according to the customer. For example, the service robot 13 identifies the type of the customer who has approached the predetermined face-to-face distance and performs guidance according to the identified type through at least one of the robot operation display unit 41 and the robot sound output unit 42. Specifically, the service robot 13 determines, for example, whether the customer is new or already served, whether or not the customer is a disabled person, whether or not the customer is an elderly person, whether or not the customer is a child, and whether or not the customer has reserved a visit to the branch.

For example, if the customer who has approached the predetermined face-to-face distance is new, the service robot 13 outputs "Thank you for your first visit" through at least one of the robot operation display unit 41 and the robot sound output unit 42. As another example, if the customer who has approached the predetermined face-to-face distance is already served, the service robot 13 outputs "Mr/Ms. ABC, always thank you" through at least one of the robot operation display unit 41 and the robot sound output unit 42. As still another example, if the customer who has approached the predetermined face-to-face distance is a disabled person, an elderly person, or a child, the service robot 13 causes the robot operation display unit 41 to perform display in large letters, provides kanji with furigana, or guides them with slow voice through the robot sound output unit 42. The face image information of the customer may be stored in the robot storage unit 47 (or in the customer information database 16 of the branch) in association with the number or frequency of visits. In this case, whether or not face image information of a customer who has approached the predetermined face-to-face distance matches the face image information of any customer is determined sequentially in decreasing order of the number or frequency of visits. By performing this processing, it is possible to achieve quick identification and thus to respond quickly to customers.

According to the counter reception system 11 and the service robot 13 of the present embodiment described above, when a reception operation performed by a customer is input, the robot controller 50 acquires a reception number from the reception device 12 according to this reception operation. Further, the imaging unit 45 acquires customer image information and the robot storage unit 47 stores the reception number acquired by the robot controller 50 and the image information acquired by the imaging unit 45 in association with each other. Therefore, by reading the reception number and the image information of the customer associated with each other from the robot storage unit 47, it is possible to improve customer services using this information. Thus, according to the counter reception system 11 and the service robot 13 of the present embodiment, it is possible to improve services for customers.

The service robot 13 issues a reception ticket S, to which the reception number that the robot controller 50 has acquired from the reception device 12 is affixed, through the robot ticket issuing mechanism 44. Therefore, the customer who has performed the reception operation at the service robot 13 can receive the reception ticket S from the service robot 13. Thus, it is possible to reduce time and effort required from when the reception operation is performed until the reception ticket S is received and it is also possible to prevent errors in receiving the reception ticket S.

When a customer has performed an operation for reissuing a ticket at the service robot 13, that is, when reissuance of a reception ticket S is performed at the service robot 13, the robot controller 50 reads a reception number corresponding to image information acquired by the imaging unit 45 from the robot storage unit 47 and causes the robot ticket issuing mechanism 44 to issue the reception ticket S to which this reception number is affixed. Therefore, by acquiring image information of a customer who has lost a reception ticket S through the imaging unit 45, it is possible to cause the robot ticket issuing mechanism 44 to reissue the reception ticket S to which the reception number of the customer is affixed without letting the customer who has lost the reception ticket S perform troublesome operations. Thus, without having the customer who has lost the reception ticket S acquire a new reception number again, it is possible to perform reception with the same reception number as the original reception number.

When a customer has performed a waiting status query operation at the service robot 13, that is, when a customer checks waiting people count related information at the service robot 13, the robot controller 50 reads a reception number corresponding to image information acquired by the imaging unit 45 from the robot storage unit 47. Further, the robot controller 50 causes the reception device controller 30 to determine waiting people count related information for this reception number and provides notification thereof. Therefore, by acquiring image information of the customer through the imaging unit 45, it is possible to notify the customer of the waiting people count related information for the reception number of the customer without letting the customer perform troublesome operations. Thereby, even when the customer cannot query the waiting status since there is no lobby staff in charge, the service robot 13 can notify the customer of the waiting people count related information. Therefore, it is possible to improve customer services.

In the service robot 13, when the robot sound input unit 43 has recognized a reception operation performed by a customer from sound that has been input, the robot controller 50 acquires a reception number from the reception device 12 in accordance with this reception operation and the robot sound output unit 42 outputs this reception number by sound. Therefore, it is possible to smoothly issue reception numbers to customers who have difficulty in vision.

When a calling operation is performed on the calling operation device 14, the reception number calling device 15 and the service robot 13 provide notification of a called reception number received from the reception device 12 through at least one of number display and sound calling. Therefore, both the reception number calling device 15 and the service robot 13 can provide notification of the reception number and thus it is possible to notify the customer of the reception number over a wide range.

The service robot 13 moves in a direction toward a customer corresponding to the called reception number to notify the customer of the reception number. Therefore, it is possible to accurately notify the corresponding customer of the called reception number.

An imaging unit can also be provided on the reception device 12 such that face image information of the customer can be stored in the reception device storage unit 25, similar to the service robot 13. In this case, the reception device 12 and the service robot 13 may share data on the association between the face image information and the reception number. By sharing data, a customer who has received a reception ticket S at the reception device 12 can perform waiting status query or reissuance of the reception ticket S at the service robot 13 or a customer who has received a reception ticket S at the service robot 13 can perform waiting status query or reissuance of the reception ticket S at the reception device 12.

The robot ticket issuing mechanism 44 may not be provided in the service robot 13. In this case, when the robot controller 50 of the service robot 13 has received a reception number reply signal from the reception device controller 30 in the above-mentioned ticket issuing operation of the service robot 13, the robot controller 50 of the service robot 13 provides notification of waiting people count related information and a reception number included in the reception number reply signal through at least one of display of the robot operation display unit 41 and sound output of the robot sound output unit 42. Further, the robot controller 50 stores this reception number and face image information of a customer who has approached the predetermined face-to-face distance, which has been extracted by the imaging unit 45 at the time of the current reception operation on the robot operation display unit 41, in the robot storage unit 47 in association with each other. Thereafter, the robot controller 50 extracts face image information that can be determined as that of the same person as the stored face image information through the imaging unit 45. Upon determining that the customer of this face image information has approached a predetermined distance to the reception device 12, the robot controller 50 outputs a signal including the waiting people count related information and the reception number assigned for this customer to the reception device controller 30 and causes the reception device ticket issuing mechanism 24 to issue a reception ticket S to which the reception number and the waiting people count related information included in this signal are affixed.

The case in which a customer who has reserved a visit to the branch inputs their customer information (a name or a customer ID) and a reservation ID acquired beforehand to the service robot 13 through a touch operation on the robot operation display unit 41 or through a sound input to the robot sound input unit 43 will now be described. In this case, the robot controller 50 transmits a request for visit reservation check to the reception device controller 30 of the reception device 12. Upon receiving an OK response to the check (a response indicating that their reservation has been confirmed) from the reception device controller 30, the robot controller 50 preferentially guides the reserved customer to the counter. The above processing is not necessarily performed by a touch operation on the robot operation display unit 41 and a sound input to the robot sound input unit 43. For example, software for performing processing for displaying customer information and a reservation ID may be installed in a customer terminal and the imaging unit 45 may recognize the customer information and the reservation ID displayed on the customer terminal through their images.

For example, as a service for the elderly, when a name of staff in charge is input to the robot sound input unit 43 of the service robot 13 by sound, the robot controller 50 may transmit email to a mobile terminal of the staff in charge or a mobile terminal of alternative staff to call the staff in charge. In addition, the service robot 13 may provide the notification to a calling operation device 14 of the staff in charge through the reception device 12. Also, the service robot 13 may simply output a message "Mr/Ms. ABC (the name of lobby staff in charge), a customer is waiting" by sound through the robot sound output unit 42. If the service robot 13 causes all calling operation devices 14 or a specific calling operation device 14 to display information of staff in charge to be called through the reception device 12, counter staff who has noticed this will call the staff in charge to the lobby. The case in which the staff in charge is off, the case in which the staff in charge is absent due to another task, or the case in which information indicating that the staff in charge is not available has been recorded will now be described. In this case, the service robot 13 causes all calling operation devices 14 or a specific calling operation device 14 to display predetermined staff in charge (such as staff in charge who can substitute for the staff in charge to be called or floor staff in charge of the day) through the reception device 12. Counter staff who has noticed this display will call this staff in charge. Although the above description has been given with reference to the case in which the number of service robots 13 is one, the present invention is not limited to such a case. Two or more service robots 13 may be arranged and operated depending on the size of the branch.

A first aspect of the present invention is a counter reception system including: a reception device that assigns at least a reception number; and a service robot that is capable of communicating with the reception device. The service robot includes: an image information acquirer that acquires first image information including an image of a customer; a reception number acquirer that acquires a first reception number from the reception device, in response to a reception operation performed by the customer; and a storage unit that stores the first reception number and the first image information in association with each other.

According to the first aspect, in the service robot, the reception number acquirer acquires the first reception number from the reception device in response to the reception operation performed by the customer. The image information acquirer acquires image information of the customer. Further, the storage unit stores the reception number acquired by the reception number acquirer and the image information acquired by the image information acquirer in association with each other. Therefore, by reading the reception number and the image information of the customer associated with each other from the storage unit, it is possible to improve customer services using this information.

A second aspect of the present invention is the counter reception system according to the first aspect, and the service robot further includes a ticket issuer that issues a reception ticket indicating the first reception number.

According to the second aspect, the service robot issues a reception ticket indicating the reception number, which the reception number acquirer has acquired from the reception device, through the ticket issuer. Therefore, the customer who has performed the reception operation at the service robot can receive the reception ticket from the service robot. Thus, it is possible to reduce time and effort required from when the reception operation is performed until the reception ticket is received and it is also possible to prevent errors in receiving the reception ticket.

A third aspect of the present invention is the counter reception system according to the second aspect, and the service robot causes the image information acquirer to newly acquire image information including an image of the customer. The service robot searches for the first image information indicating the same customer as a customer indicated by the newly acquired image information in the storage unit using the newly acquired image information. The service robot reads the first reception number that is associated with the searched first image information. The service robot causes the ticket issuer to reissue a reception ticket indicating the read first reception number.

According to the third aspect, it is possible to reissue the reception ticket by newly acquiring image information of the customer through the image information acquirer without letting the customer who has lost the reception ticket perform troublesome operations. Thus, it is possible to perform reception with the same reception number as the original reception number without the need to acquire a new reception number again.

A fourth aspect of the present invention is the counter reception system according to the third aspect, and the service robot provides notification of information related to the number of people waiting for the read first reception number.

A fifth aspect of the present invention is the counter reception system according to the first or second aspect, and the service robot causes the image information acquirer to newly acquire image information including an image of the customer. The service robot searches for the first image information indicating the same customer as a customer indicated by the newly acquired image information in the storage unit using the newly acquired image information. The service robot reads the first reception number that is associated with the searched first image information. The service robot provides notification of information related to the number of people waiting for the read first reception number.

According to the fifth aspect, by newly acquiring image information of a customer through the image information acquirer without letting the customer perform troublesome operations, it is possible to provide notification of information related to the number of people waiting (waiting people count related information) for the reception number of the customer.

A sixth aspect of the present invention is the counter reception system according to any one of the first to fifth aspects, and the service robot further includes a sound recognizer that recognizes sound generated by the customer and that receives an input of a reception operation from the customer based on the recognized sound.

According to the sixth aspect, in the service robot, the sound recognizer receives an input of a reception operation from the customer by sound and the reception number acquirer acquires the reception number from the reception device in response to the reception operation. Therefore, it is possible to smoothly issue reception numbers to customers who have difficulty in vision.

A seventh aspect of the present invention is the counter reception system according to any one of the first to sixth aspects, and the counter reception system further includes: a calling operation device that is capable of communicating with the reception device and receives a calling operation for calling the first reception number; and a reception number calling device that is capable of communicating with the reception device. The reception device transmits the first reception number to the reception number calling device and the service robot, in response to the calling operation device receiving the calling operation. The reception number calling device and the service robot provide notification of the first reception number through at least one of display and sound.

According to the seventh aspect, in response to the calling operation device receiving a calling operation, the reception number calling device and the service robot provide notification of a called reception number through at least one of display and sound. Therefore, both the reception number calling device and the service robot can provide notification of the reception number and thus it is possible to notify the customer of the reception number over a wide range.

An eighth aspect of the present invention is the counter reception system according to the seventh aspect, the service robot reads the first image information stored in association with the first reception number, from the storage unit. The service robot causes the image information acquirer to find image information corresponding to the read first image information. The service robot moves in a direction based on the found image information. The service robot provides notification of the first reception number through at least one of display and sound.

According to the eighth aspect, the service robot moves in a direction toward a customer corresponding to a called reception number to notify the customer of the reception number. Therefore, it is possible to accurately notify the corresponding customer of the called reception number.

A ninth aspect of the present invention is the counter reception system according to any one of the first to eighth aspects, and the service robot has a shape simulating a human body.

A tenth aspect of the present invention is a service robot that is capable of communicating with a reception device that assigns at least a reception number. The service robot includes: an image information acquirer that acquires image information including an image of a customer; a reception number acquirer that acquires a reception number from the reception device, in response to a reception operation performed by the customer; and a storage unit that stores the acquired reception number and the acquired image information in association with each other.

According to the tenth aspect, the reception number acquirer acquires the first reception number from the reception device in response to the reception operation performed by the customer. The image information acquirer acquires image information of the customer. Further, the storage unit stores the reception number acquired by the reception number acquirer and the image information acquired by the image information acquirer in association with each other. Therefore, by reading the reception number and the image information of the customer associated with each other from the storage unit, it is possible to improve customer services using this information.

The present invention may be applied to a counter reception system and a service robot.

What is claimed is:

1. A counter reception system comprising:
   a reception device controller configured to assign at least a reception number; and
   a service robot configured to communicate with the reception device controller,
   wherein the service robot comprises a robot controller configured to:
   acquire first image information including an image of a customer;
   acquire a first reception number from the reception device controller, in response to a number reception operation performed by the customer;
   store the reception number including the first reception number, the image information including the first image information, and at least one of number of visits and frequency of visits;
   wherein the service robot is configured to newly acquire image information including an image of the customer,
   wherein the service robot is configured to search for the first image information indicating the same customer as a customer indicated by the newly acquired image information, by determining whether the newly acquired image information matches the image information in order of the at least one of the number of visits and the frequency of visits that is associated with the image information, and
   the service robot is configured to perform a service to the customer based on the first reception number that is associated with the searched first image information.

2. The counter reception system according to claim 1, wherein the service robot further comprises a printer configured to issue a reception ticket indicating the first reception number.

3. The counter reception system according to claim 2, wherein the service robot is configured to read the first reception number that is associated with the searched first image information, and
the service robot is configured to cause the printer to reissue a reception ticket indicating the read first reception number based on an input from the customer.

4. The counter reception system according to claim 3, wherein the service robot is configured to provide notification of information related to the number of people in front of the person with the first reception number.

5. The counter reception system according to claim 1, wherein the service robot is configured to read the first reception number that is associated with the searched first image information, and
the service robot is configured to provide notification of information related to the number of people in front of the person with the first reception number.

6. The counter reception system according to claim 1, wherein the service robot further comprises a sound input configured to recognize sound generated by the customer and configured to receive an input of a reception operation from the customer based on the recognized sound.

7. The counter reception system according to claim 1, further comprising:
a calling operation input that is configured to communicate with the reception device controller and to receive a calling operation for calling the first reception number; and
a reception number calling output that is configured to communicate with the reception device controller,
wherein the reception device controller is configured transmit the first reception number to the reception number calling output and the service robot, in response to the calling operation input receiving the calling operation, and
the reception number output and the service robot are configured to provide notification of the first reception number through at least one of display and sound.

8. The counter reception system according to claim 7, wherein the service robot is configured to read the first image information stored in association with the first reception number, from the storage unit,
the robot controller is configured to find image information corresponding to the read first image information,
the service robot is configured to move in a direction based on the found image information, and
the service robot is configured to provide notification of the first reception number through at least one of display and sound.

9. The counter reception system according to claim 1, wherein the service robot has a shape simulating a human body.

10. The counter reception system according to claim 1, wherein the service robot is configured to identify a type of a customer based on image information including an image of the customer and performs guidance according to the identified type of the customer.

11. The counter reception system according to claim 1, wherein the service robot is configured to determine that an operation input indicating that a reception ticket is not to be issued is performed, in a case where a customer leaves the service robot during a reception process.

12. The counter reception system according to claim 1, wherein, in a case where the service robot detects that the customer forgets to take out a reception ticket, the service robot is configured to notify the customer of forgetting to take out the reception ticket based on the first image information stored in the storage unit.

13. The counter reception system according to claim 1, wherein the service robot is configured to perform a service to the customer based on the first reception number and the at least one of the number of visits and the frequency of visits that are associated with the searched first image information.

14. A service robot configured to communicate with a reception device controller configured to assign at least a reception number, the service robot comprising:
a camera configured to acquire image information including an image of a customer;
a robot controller configured to acquire a reception number from the reception device controller, in response to a number reception operation performed by the customer;
a storage unit configured to store the reception number including the acquired reception number, the image information including the acquired image information, and at least one of number of visits and frequency of visits;
the service robot is configured to cause the camera to newly acquire image information including an image of the customer,
the service robot is configured to search for the first image information indicating the same customer as a customer indicated by the newly acquired image information in the storage unit, by determining whether the newly acquired image information matches the image information in order of the at least one of the number of visits and the frequency of visits that is associated with the image information, and
the service robot is configured to perform a service to the customer based on the first reception number that is associated with the searched first image information.

* * * * *